(12) United States Patent
Nakao et al.

(10) Patent No.: US 12,199,453 B2
(45) Date of Patent: Jan. 14, 2025

(54) FOREIGN MATTER DETECTION DEVICE

(71) Applicant: OMRON Corporation, Kyoto (JP)

(72) Inventors: Goro Nakao, Kyoto (JP); Yuki Ito, Kyoto (JP); Taichi Mishima, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 18/463,285

(22) Filed: Sep. 7, 2023

(65) Prior Publication Data

US 2024/0146118 A1 May 2, 2024

(30) Foreign Application Priority Data

Oct. 26, 2022 (JP) ................. 2022-171706

(51) Int. Cl.
*H02J 50/60* (2016.01)
*H02J 50/10* (2016.01)

(52) U.S. Cl.
CPC .............. *H02J 50/60* (2016.02); *H02J 50/10* (2016.02)

(58) Field of Classification Search
CPC .......... H02J 50/60; H02J 50/402; H02J 50/12
See application file for complete search history.

(56) References Cited

U.S. PATENT DOCUMENTS

| | | | | |
|---|---|---|---|---|
| 2015/0349542 A1* | 12/2015 | Yamamoto | ............ | H02J 50/12 307/104 |
| 2016/0013658 A1* | 1/2016 | Kohara | ............ | H02J 50/12 307/104 |
| 2016/0336760 A1* | 11/2016 | Yamamoto | ............ | H02J 50/10 |
| 2019/0393732 A1* | 12/2019 | Oshima | ............ | H02J 50/12 |
| 2020/0266671 A1* | 8/2020 | Choi | ............ | H02J 50/60 |
| 2021/0167636 A1* | 6/2021 | Sherman | ............ | H02J 50/60 |
| 2022/0069637 A1* | 3/2022 | Khromova | ............ | H02J 50/90 |
| 2023/0208202 A1* | 6/2023 | Draak | ............ | H02J 50/80 307/104 |
| 2024/0313585 A1* | 9/2024 | Covic | ............ | H02J 50/10 |

FOREIGN PATENT DOCUMENTS

JP 2021052514 4/2021

* cited by examiner

*Primary Examiner* — Daniel Kessie
*Assistant Examiner* — Terrence R Willoughby
(74) *Attorney, Agent, or Firm* — JCIPRNET

(57) ABSTRACT

A foreign matter detection device includes: a plurality of detection coils (43-1 to 43-*n*) between a transmission coil (12) of a power transmission device (2) and a reception coil (21) of a power reception device (3), through which power is transmitted in a contactless manner; a plurality of capacitors (44-1 to 44-*n*) forming, for each of the detection coils, a resonance circuit together with the detection coil; a power supply circuit (41) supplying AC power having a predetermined frequency to each detection coil; and a detection circuit (45) detecting a voltage output from each detection coil and detecting a foreign matter entering between the transmission coil (12) and the reception coil (21) according to the voltage detected. Then, each detection coil is arranged to overlap by a predetermined amount that allows electromagnetic coupling between adjacent two of the detection coils (43-1 to 43-*n*) to be ignored.

1 Claim, 8 Drawing Sheets

FOREIGN MATTER DETECTION DEVICE

CROSS-REFERENCE TO RELATED APPLICATION

This application claims the priority benefits of Japanese application no. 2022-171706, filed on Oct. 26, 2022. The entirety of the above-mentioned patent application is hereby incorporated by reference herein and made a part of this specification.

BACKGROUND

Technical Field

The disclosure relates to a foreign matter detection device that detects a foreign matter in a power transmission system through which power is transmitted in a contactless manner.

Description of Related Art

Studies have been conducted on so-called contactless power feeding (also called wireless power supply) technologies that transmit power through space without using metal contacts or the like. A system that supplies power by electromagnetic induction is known as one of such contactless power feeding technologies. In the system that supplies power by electromagnetic induction, the coil (hereinafter referred to as transmission coil) on the primary side (power transmission side or power feeding side) and the coil (hereinafter referred to as reception coil) on the secondary side (power reception side) are electromagnetically coupled so as to transfer power from the transmission coil to the reception coil.

In a power transmission system using such contactless power feeding technologies, a foreign matter such as metal may enter between the transmission coil and the reception coil. In such a case, the foreign matter may be heated and ignited by induction during power transmission, or the device may malfunction due to the heat generated by the foreign matter. Besides, in such a power transmission system, the relative positional relationship between the transmission coil and the reception coil may fluctuate during power transmission, resulting in a change in the degree of coupling between the transmission coil and the reception coil. Therefore, a technology has been proposed for detecting the foreign matter that enters between the transmission coil and the reception coil (see, for example, Patent Document 1 (Japanese Patent Application Laid-Open No. 2021-52514)). According to this technology, on a substrate arranged between the transmission coil of the power transmission device and the reception coil of the power reception device, there are a plurality of first detection coils that are arranged to be electromagnetically coupled to each other and form a resonance circuit having a first resonance frequency together with a first capacitor, a plurality of second detection coils that are arranged to be electromagnetically coupled to each other and form a resonance circuit having a second resonance frequency together with a second capacitor, a power supply circuit that supplies to each detection coil AC power having a frequency at which the detection coil resonates, and a detection circuit that detects a foreign matter entering between the transmission coil and the reception coil according to the voltage of the AC power transmitted via each detection coil. In addition, the plurality of first detection coils and the plurality of second detection coils are alternately arranged when viewed from the normal direction of the substrate.

With the technology described above, it is possible to detect even a relatively small foreign matter that enters between the transmission coil and the reception coil. However, since the foreign matter entering between the transmission coil and the reception coil poses a high risk, it is required to further improve the accuracy of detecting such a foreign matter.

The disclosure provides a foreign matter detection device that is capable of improving the accuracy of detecting a foreign matter entering between a transmission coil of a device on the power transmission side and a reception coil of a device on the power reception side.

SUMMARY

A foreign matter detection device is provided as one form of the disclosure. The foreign matter detection device includes: a plurality of detection coils arranged at different positions between a transmission coil of a power transmission device and a reception coil of a power reception device, through which power is transmitted in a contactless manner; a plurality of capacitors forming, for each of the plurality of detection coils, a resonance circuit together with the detection coil; a power feeding coil arranged to be electromagnetically coupled with each of the plurality of detection coils; a power supply circuit supplying AC power having a predetermined frequency to each of the plurality of detection coils via the power feeding coil; and a detection circuit detecting a voltage output from each of the plurality of detection coils with respect to the AC power supplied, and detecting a foreign matter entering between the transmission coil and the reception coil according to the voltage detected. Then, each of the plurality of detection coils is arranged to overlap by a predetermined amount that allows electromagnetic coupling between adjacent two of the plurality of detection coils to be ignored. With such a configuration, the foreign matter detection device is capable of improving the accuracy of detecting a foreign matter that has entered between the transmission coil of the device on the power transmission side and the reception coil of the device on the power reception side.

DESCRIPTION OF THE EMBODIMENTS

A foreign matter detection device according to one embodiment of the disclosure will be described below with reference to the drawings. The foreign matter detection device includes a substrate arranged between a transmission coil of a device on the power transmission side (hereinafter simply referred to as power transmission device) and a reception coil of a device on the power reception side (hereinafter simply referred to as power reception device), included in a power transmission system that transmits power in a contactless manner. The foreign matter detection device includes a power feeding coil formed on the substrate for supplying power for foreign matter detection, and a plurality of detection coils arranged at mutually different positions within the power feeding coil to be electromagnetically coupled with the power feeding coil and being smaller than the power feeding coil. Each of the plurality of detection coils is capable of resonating at a frequency, which is different from the frequency of the power supplied to the transmission coil of the power transmission device and at which neither the resonance circuit including the transmission coil (when the resonance circuit is provided on the power transmission side) nor the resonance circuit including the reception coil resonates. The foreign matter detection device supplies AC power having a frequency at which these detection coils resonate to the power feeding coil, and detects the voltage output from each of the plurality of detection coils. If a conductive foreign matter such as metal enters between the transmission coil and the reception coil, the resonance characteristics of any of the plurality of detection coils change, resulting in a change in the detected voltage. Thereby, the foreign matter detection device monitors the detected voltage, and determines that a foreign matter has entered between the transmission coil and the reception coil if the voltage deviates from a predetermined reference range corresponding to a case where no foreign matter is present. Furthermore, each of the plurality of detection coils is arranged so that adjacent two of the plurality of detection coils overlap by a predetermined amount that allows mutual electromagnetic coupling to be ignored when viewed from the normal direction of the substrate. As a result, the foreign matter entering between the transmission coil and the reception coil is positioned inside any of the detection coils when viewed from the normal direction of the substrate, and since the detection coil whose resonance characteristics are changed by the foreign matter is not affected by other detection coils, the accuracy of detecting the foreign matter is improved.

Figure 1:
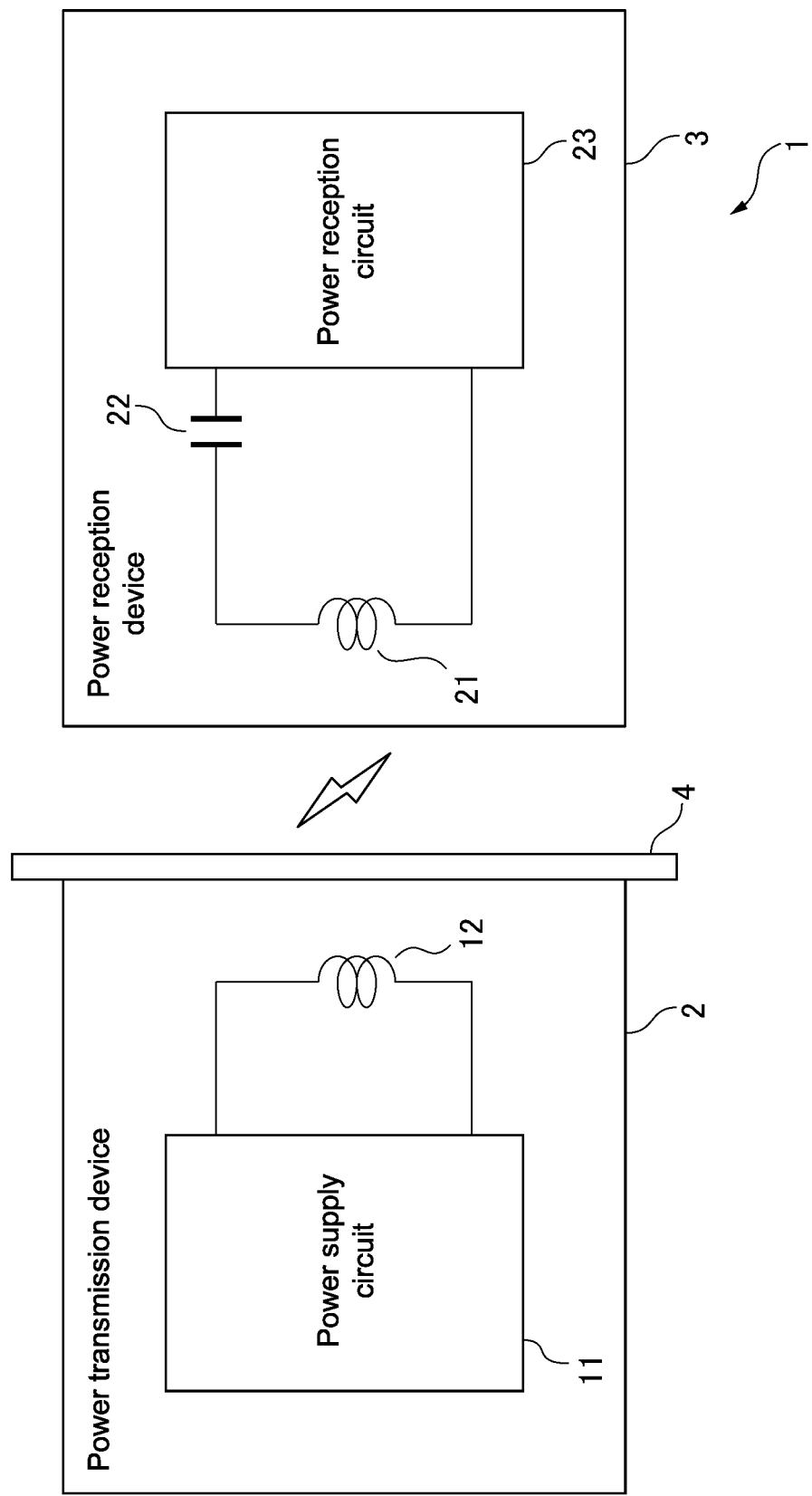
FIG. 1 is a schematic configuration diagram of the power transmission system including the foreign matter detection device according to one embodiment of the disclosure.

FIG. 1 is a schematic configuration diagram of a power transmission system including a foreign matter detection device according to one embodiment of the disclosure. As shown in FIG. 1, the power transmission system 1 includes a power transmission device 2, a power reception device 3, and a foreign matter detection device 4. The power transmission device 2 and the power reception device 3 constitute a contactless power feeding device. Power is transmitted from the power transmission device 2 to the power reception device 3 through space in a contactless manner. The power transmission device 2 includes a power supply circuit 11 and a transmission coil 12 while the power reception device 3 includes a reception coil 21, a resonance capacitor 22, and a power reception circuit 23. The power transmission system 1 may be, for example, a contactless power feeding device of a so-called primary-series-secondary-series resonance capacitor system (SS system) or primary-series-secondary-parallel resonance capacitor system (SP system). Alternatively, the power transmission system 1 may be a contactless power feeding device of a system (NS system) in which the reception coil and the resonance capacitor resonate in series on the secondary side without using resonance on the primary side, or a system (NP system) in which the reception coil and the resonance capacitor resonate in parallel on the secondary side without using resonance on the primary side.

The power transmission device 2 will be described first. The power supply circuit 11 supplies AC power to the transmission coil 12. Therefore, the power supply circuit 11 includes, for example, a DC power supply that supplies DC power, an inverter circuit that converts the DC power supplied from the DC power supply into AC power and supplies the AC power to the transmission coil 12, and a control circuit that controls the inverter circuit. The inverter circuit may be a full-bridge inverter in which four switching elements (for example, MOSFETs) are connected in a full-bridge form, or a half-bridge inverter in which two switching elements are connected in a half-bridge form. The control circuit controls on/off switching of each switching element of the inverter circuit to set the frequency of the AC power supplied to the transmission coil 12 to a predetermined frequency (for example, the frequency at which the resonance circuit of the power reception device 3 resonates).

The power supply circuit 11 may further include a DC-DC converter between the DC power supply and the inverter circuit. Alternatively, the power supply circuit 11 may include a rectifier circuit that is connected to an AC power supply and rectifies the AC power from the AC power supply, and a power factor correction circuit that is connected to the rectifier circuit and converts pulsating flow power output from the rectifier circuit into DC power, instead of the DC power supply. In this case, for example, the control circuit may control the power factor correction circuit to adjust the voltage of the DC power supplied to the inverter circuit in order to keep the voltage of the power received by the power reception device 3 constant.

The transmission coil 12 transmits the AC power supplied from the power supply circuit 11 to the reception coil 21 of the power reception device 3 through space. The power transmission device 2 may include a capacitor connected in series with the transmission coil 12 between the transmission coil 12 and the inverter circuit of the power supply circuit 11. This capacitor may be for blocking the DC power, or may be for configuring a resonance circuit that resonates together with the transmission coil 12 at the frequency of the AC power supplied to the transmission coil 12.

The power transmission device 2 may further include a communication device that receives a signal indicating the state of power reception of the power reception device 3. In this case, the control circuit of the power supply circuit 11 may change the on/off switching timing of each switching element of the inverter circuit so as to change the frequency of the AC power supplied to the transmission coil 12 according to the state of power reception.

Further, when receiving a signal indicating that a foreign matter has been detected between the transmission coil 12 and the reception coil 21 from the foreign matter detection device 4, the control circuit of the power supply circuit 11 may stop the power supply from the power supply circuit 11 to the transmission coil 12 by turning off each switching element of the inverter.

Furthermore, the power supply circuit 11 may include a DC-AC converter instead of the inverter circuit. Such a DC-AC converter may include a coil that is connected in series between the DC power supply and the transmission coil 12, a capacitor that has one end connected between the coil and the transmission coil 12 and is connected in parallel to the transmission coil 12, and a switching element that is connected in parallel to the capacitor. Then, the switching element can be a field effect transistor made of gallium nitride (GaN). Such a configuration allows the power supply circuit 11 to switch the switching element on and off at a switching frequency included in the ISM band to supply the transmission coil 12 with AC power having the switching frequency included in the ISM band.

Next, the power reception device 3 will be described. The reception coil 21 forms a resonance circuit together with the resonance capacitor 22 and receives power from the transmission coil 12 by resonating with the alternating current flowing through the transmission coil 12 of the power transmission device 2. Therefore, the resonance capacitor 22 may be connected in series with the reception coil 21 or may be connected in parallel to the reception coil 21. Then, the AC power output from the resonance circuit formed by the reception coil 21 and the resonance capacitor 22 is output to the power reception circuit 23. The number of turns of the reception coil 21 and the number of turns of the transmission coil 12 may be the same or may be different from each other.

The power reception circuit 23 converts the AC power from the resonance circuit formed by the reception coil 21 and the resonance capacitor 22 into DC power, and outputs the DC power to a load circuit (not shown) connected to the power reception circuit 23. Therefore, the power reception circuit 23 includes, for example, a full-wave rectifier circuit that converts the AC power from the resonance circuit into pulsating flow power, and a smoothing capacitor for smoothing the pulsating flow power output from the full-wave rectifier circuit and outputting the same to the load circuit. The power reception circuit 23 may further include a voltmeter for measuring the voltage output to the load circuit, a communication device for transmitting a signal indicating the state of power reception, such as voltage measured by the voltmeter, to the power transmission device 2, a switching element for switching between connection or disconnection between the load circuit and the power reception circuit 23, and a control circuit controlling on/off switching of the switching element.

Next, the foreign matter detection device 4 according to this embodiment will be described. The foreign matter detection device 4 is arranged between the transmission coil 12 and the reception coil 21 in a case where the power transmission device 2 and the power reception device 3 are in a positional relationship that allows power transmission, that is, a positional relationship that allows the transmission coil 12 and the reception coil 21 to be electromagnetically coupled. Then, the foreign matter detection device 4 detects a conductive foreign matter such as metal that has entered between the transmission coil 12 and the reception coil 21.

Figure 2:
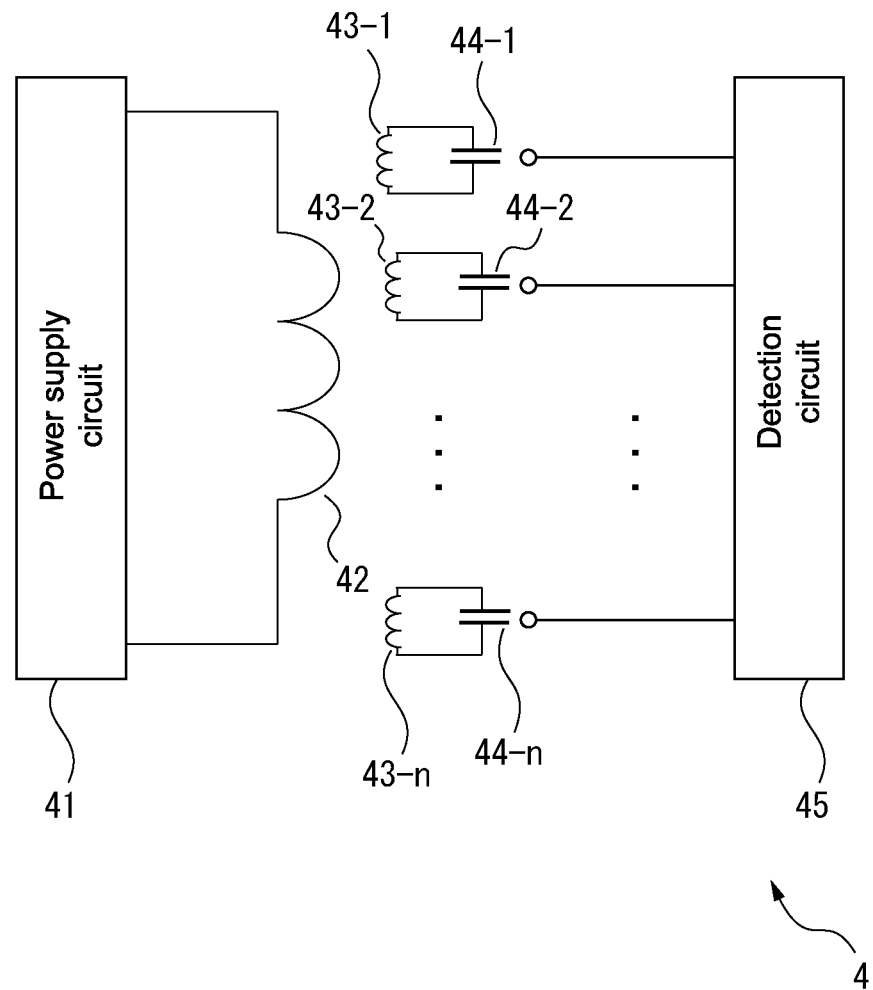
FIG. 2 is a schematic configuration diagram of the foreign matter detection device.
Figure 3:
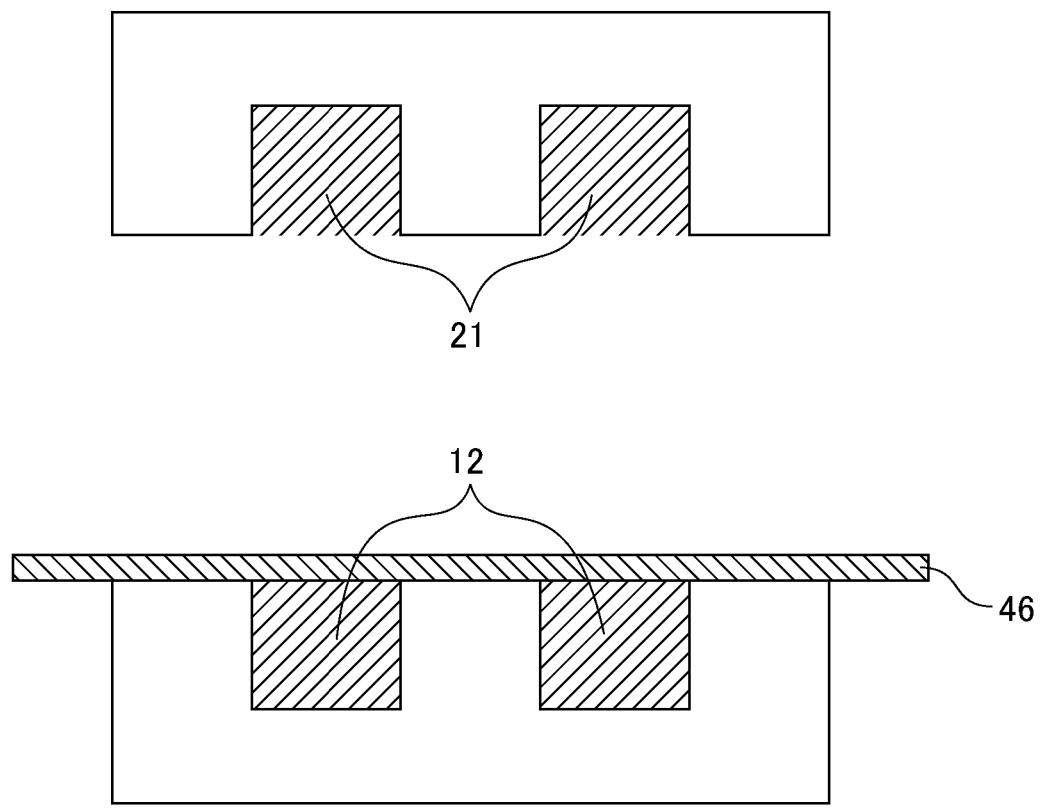
FIG. 3 is a schematic cross-sectional side view showing an example of the positional relationship between the substrate, on which the foreign matter detection device is provided, and the transmission coil.
Figure 4:
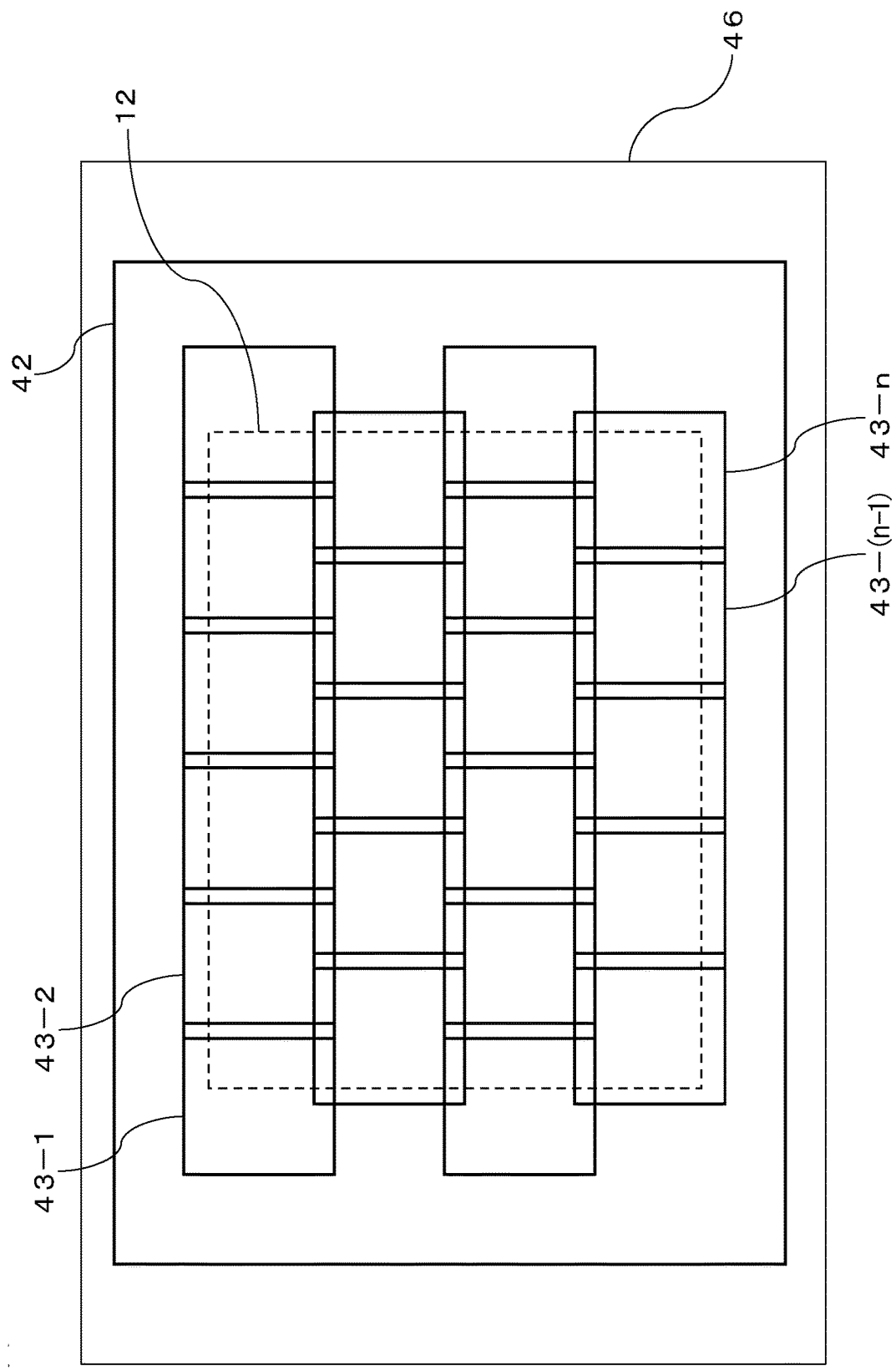
FIG. 4 is a schematic plan view showing an example of the arrangement of a plurality of detection coils and the power feeding coil of the foreign matter detection device.

FIG. 2 is a schematic configuration diagram of the foreign matter detection device 4. FIG. 3 is a schematic cross-sectional side view showing an example of the positional relationship between the substrate, on which the foreign matter detection device 4, is provided and the transmission coil 12. In addition, FIG. 4 is a schematic plan view showing an example of the arrangement of a plurality of detection coils and the power feeding coil of the foreign matter detection device 4.

As shown in FIG. 2, the foreign matter detection device 4 includes a power supply circuit 41, a power feeding coil 42, a plurality of detection coils 43-1 to 43-$n$ (n is an integer of 2 or more), a plurality of capacitors 44-1 to 44-$n$, and a detection circuit 45. The power supply circuit 41, the power feeding coil 42, the plurality of detection coils 43-1 to 43-$n$, the plurality of capacitors 44-1 to 44-$n$, and the detection circuit 45 are provided on a substrate 46 positioned between the transmission coil 12 and the reception coil 21 when the transmission coil 12 and the reception coil 21 are in a positional relationship that allows them to be electromagnetically coupled. In this embodiment, the substrate 46 is attached to the power transmission device 2. Then, a signal indicating a foreign matter detection result from the detection circuit 45 is output to the power supply circuit 11 of the power transmission device 2.

Figure 5:
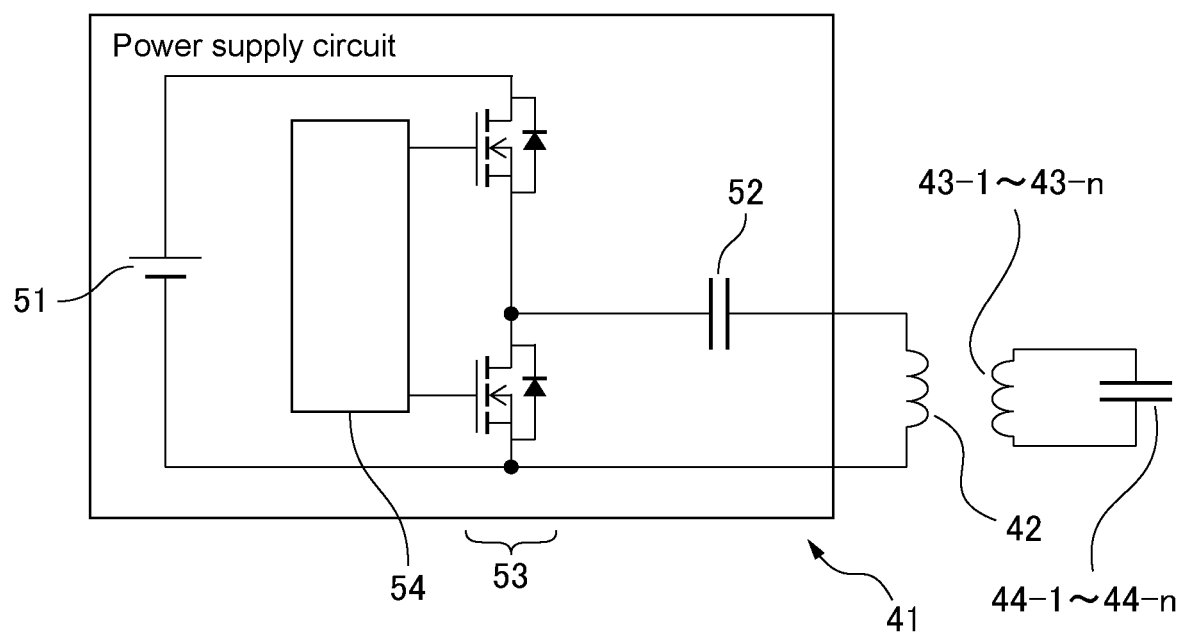
FIG. 5 is a circuit configuration diagram showing an example of the power supply circuit.

FIG. 5 is a circuit configuration diagram showing an example of the power supply circuit 41. The power supply circuit 41 includes, for example, a DC power supply 51 that supplies DC power, a capacitor 52, an inverter circuit 53, and a control circuit 54 that controls the inverter circuit 53. Then, the power supply circuit 41 supplies power for foreign matter detection to the detection coils 43-1 to 43-$n$ through the power feeding coil 42.

The power feeding coil 42 has one end connected to the inverter circuit 53 via the capacitor 52 and the other end grounded. Nevertheless, the connection order of the power feeding coil 42 and the capacitor 52 may be changed.

The inverter circuit 53 converts the DC power supplied from the DC power supply 51 into AC power and supplies the AC power to the power feeding coil 42. In this example, the inverter circuit 53 is configured as a half-bridge inverter in which two switching elements (for example, MOSFETs) are connected in a half-bridge form, but the inverter circuit 53 may be a full-bridge inverter in which four switching elements are connected in a full-bridge form. The control circuit 54 controls on/off switching of each switching element included in the inverter circuit to set the frequency of the AC power supplied to the power feeding coil 42 to a predetermined frequency.

The frequency of the AC power supplied from the power supply circuit 41 to the detection coils 43-1 to 43-$n$ via the power feeding coil 42 is different from the frequency of the AC power supplied to the transmission coil 12 of the power transmission device 2, and is preferably set to a frequency at which neither the resonance circuit including the transmission coil 12 (when the resonance circuit is provided in the power transmission device 2) nor the resonance circuit including the reception coil 21 resonates. For example, the frequency of the AC power supplied by the power supply circuit 41 can be higher than the frequency of the AC power supplied to the transmission coil 12 (for example, 85 kHz or 150 kHz), which prevents the AC power supplied from the power supply circuit 41 from affecting the power transmission from the power transmission device 2 to the power reception device 3. Besides, by setting the frequency of the AC power supplied by the power supply circuit 41 in this way, the inductance of each of the plurality of detection coils 43-1 to 43-$n$ of the foreign matter detection device 4 can be made relatively small, so it is easy to make the size of each detection coil smaller than the size of the transmission coil 12.

Referring to FIG. 2 to FIG. 4 again, each of the power feeding coil 42 and the plurality of detection coils 43-1 to 43-$n$ is configured as a wiring pattern of a conductor such as metal, which is provided on the substrate 46. Then, each detection coil 43-$i$ and the corresponding capacitor 44-$i$ (i=1, 2, . . . , n) are connected to each other to form one resonance circuit. The power supply circuit 41, the capacitor 44-$i$, and the detection circuit 45 are omitted from FIG. 4. The inductance of each detection coil and the electrostatic capacitance of each capacitor are preferably set so that the resonance frequency of the resonance circuit composed of the detection coil and the capacitor is a frequency that does not resonate with the frequency of the AC power supplied to the transmission coil 12. Since each resonance circuit of the foreign matter detection device 4 does not resonate with the AC power transmitted from the power transmission device 2 to the power reception device 3, the foreign matter detection device 4 is capable of preventing the AC power transmitted from the power transmission device 2 to the power reception device 3 from affecting foreign matter detection. Further, the inductance of each detection coil and the electrostatic capacitance of each capacitor are preferably set so that the resonance frequency of the resonance circuit composed of the detection coil and the capacitor is a frequency that resonates with the frequency of the AC power supplied from the power supply circuit 41 via the power feeding coil 42. Since the AC power supplied from the power supply circuit 41 via the power feeding coil 42 is suppressed from being lost until it reaches the detection circuit 45, the foreign matter detection device 4 is capable of suppressing a decrease in foreign matter detection accuracy. It should be noted that the resonance frequency of each resonance circuit and the frequency of the AC power supplied from the power supply circuit 41 may not match each other as long as a voltage corresponding to the AC power supplied from the power supply circuit 41 is output from each detection coil to the detection circuit 45.

In addition, the substrate 46 is arranged so that the central axis direction of the transmission coil 12 and the normal direction of the substrate 46 are substantially parallel. Then, it is preferable to provide the power feeding coil 42 so that the outer diameter of the power feeding coil 42, viewed from the normal direction of the substrate 46, that is, the central axis direction of the transmission coil 12, is approximately the same as the outer shape of the transmission coil 12 or larger than the transmission coil 12. Further, it is preferable to provide the power feeding coil 42 so that the transmission coil 12 is positioned inside the power feeding coil 42 when viewed from the normal direction of the substrate 46. Each of the plurality of detection coils 43-1 to 43-$n$ is smaller than the power feeding coil 42 on one surface of the substrate 46, and is arranged to be electromagnetically coupled with the power feeding coil 42 at a different position inside the power feeding coil 42 when viewed from the normal direction of the substrate 46. Thus, the power feeding coil 42 is capable of reliably supplying power for foreign matter detection to each detection coil. Accordingly, when each detection coil resonates with the corresponding capacitor in response to the AC power supplied from the power supply circuit 41 via the power feeding coil 42, a voltage corresponding to the AC power is output from each detection coil to the detection circuit 45. It should be noted that one or two or more of the plurality of detection coils may be arranged outside the power feeding coil 42 or overlapping the power feeding coil 42 when viewed from the normal direction of the substrate 46 as long as each of the plurality of detection coils is allowed to receive power from the power feeding coil 42.

Furthermore, adjacent two detection coils, among the plurality of detection coils 43-1 to 43-$n$, are arranged to overlap by a predetermined amount that allows the electromagnetic coupling between the two detection coils to be ignored when viewed from the normal direction of the substrate 46. At this time, an insulating layer (not shown) is provided between the two detection coils to keep the two detection coils from being electrically connected at the position where the two detection coils overlap each other.

In the example shown in FIG. 4, each detection coil has a rectangular shape and the detection coils are arranged in a staggered pattern. In both the horizontal direction and the vertical direction, adjacent two detection coils are arranged to overlap by a predetermined amount that allows the mutual electromagnetic coupling to be ignored when viewed from the normal direction of the substrate 46.

As the detection coils are arranged to make adjacent two detection coils partially overlap each other, a foreign matter entering between the transmission coil 12 and the reception coil 21 is positioned inside any one of the detection coils when viewed from the normal direction of the substrate 46. Then, the detection coil having the foreign matter therein changes the resonance characteristics under the influence of the foreign matter. Besides, the electromagnetic coupling between the detection coils can be ignored. That is to say, the influence of the electromagnetic coupling between the detection coils on the resonance characteristics of the individual detection coil is sufficiently smaller than the change in resonance characteristics of the detection coil caused by the foreign matter. Therefore, the detection coil whose resonance characteristics are changed by the foreign matter is not affected by the other detection coils. Hence, the detection circuit 45 corresponding to the detection coil having the foreign matter therein is capable of accurately detecting the change in voltage due to the change in resonance characteristics. Details of the degree of overlap between adjacent two detection coils will be described later.

Moreover, in this example, the power feeding coil 42 and the detection coils 43-1 to 43-$n$ are arranged on the same surface of the substrate 46, but the surface of the substrate 46 on which the power feeding coil 42 is arranged may be different from the surface of the substrate 46 on which the detection coils 43-1 to 43-$n$ are arranged. In addition, some of the detection coils 43-1 to 43-$n$ may be arranged on the same surface as the power feeding coil 42 while some other detection coils 43-1 to 43-$n$ are arranged on a different surface from the power feeding coil 42.

In the example shown in FIG. 4, each of the plurality of detection coils 43-1 to 43-$n$ is formed in a rectangular shape, but the shape of each detection coil is not limited to a rectangular shape and may be a circular or elliptical shape, for example. The shapes and sizes of the plurality of detection coils 43-1 to 43-$n$ may be the same as or different from each other. Furthermore, the size of each of the plurality of detection coils 43-1 to 43-$n$ viewed from the central axis direction of the transmission coil 12 is preferably smaller than the size of the transmission coil 12. Thus, even if a foreign matter smaller than the transmission coil 12 enters between the transmission coil 12 and the reception coil 21, any one of the detection coils 43-1 to 43-$n$ is easily affected by the foreign matter, which enables the foreign matter detection device 4 to accurately detect such a small foreign matter.

The detection circuit 45 detects the voltage of the AC power output from each of the plurality of detection coils 43-1 to 43-$n$, and detects the foreign matter entering between the transmission coil 12 and the reception coil 21 based on the detected voltage.

In this embodiment, the AC power transmitted from the power transmission device 2 to the power reception device 3 does not affect transmission of the AC power from the power supply circuit 41 to the detection circuit 45 via the power feeding coil 42 and any of the plurality of detection coils 43-1 to 43-n. However, if a foreign matter enters between the transmission coil 12 and the reception coil 21, the resonance characteristics of the detection coil having the foreign matter therein, among the plurality of detection coils 43-1 to 43-n, change due to the foreign matter. Therefore, the presence of the foreign matter affects transmission of the AC power from the power supply circuit 41 to the detection circuit 45 via the detection coil in which the foreign matter is located. As a result, the voltage that is output from the detection coil having the foreign matter therein and detected by the detection circuit 45 changes. For example, if metal approaches any of the detection coils through which a current flows due to the supplied AC power, a magnetic flux is generated near the detection coil by the current and causes an eddy current in the metal, resulting in a loss. In addition, the inductance of the detection coil decreases due to the magnetic flux resulting from the generated eddy current. In particular, when the metal is magnetic, the loss may be relatively large even though the change in inductance is small. As a result of these, the resonance characteristics of the resonance circuit containing the detection coil change. Thus, the detection circuit 45 determines whether the voltage output from the detection coil is within a predetermined reference range for each of the plurality of detection coils 43-1 to 43-n. The predetermined reference range may be the same for the detection coils or may be set for each detection coil.

Figure 6:
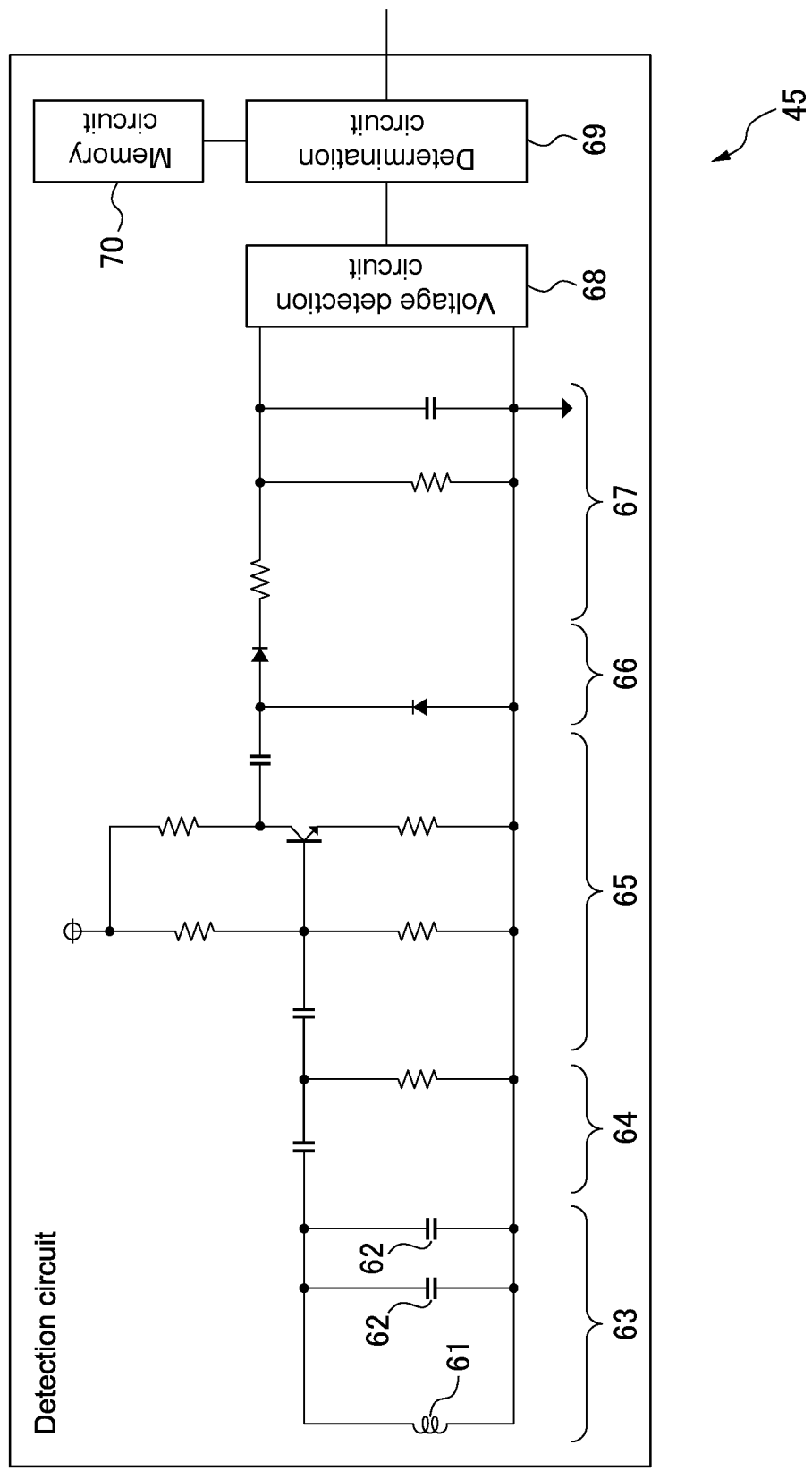
FIG. 6 is a circuit configuration diagram showing an example of the detection circuit.

FIG. 6 is a circuit configuration diagram showing an example of the detection circuit 45. Since the detection circuit 45 can have the same configuration for each detection coil, FIG. 6 shows the configuration of the detection circuit 45 for one detection coil.

The detection circuit 45 includes a resonance circuit 63 having a reception coil 61 and a resonance capacitor 62, a high-pass filter 64, an amplifier 65, a half-wave rectifier circuit 66, a low-pass filter 67, a voltage detection circuit 68, a determination circuit 69, and a memory circuit 70. However, the circuit configuration of the detection circuit 45 is not limited to the one shown in FIG. 6, and can be any of a variety of circuits capable of determining whether the detected voltage is outside the predetermined reference range.

The resonance circuit 63 detects the AC power that is supplied from the power supply circuit 41 and transmitted via the power feeding coil 42 and the corresponding detection coil 43-i (i=1, 2, . . . , n) among the plurality of detection coils 43-1 to 43-n. Therefore, the reception coil 61 of the resonance circuit 63 is arranged to be electromagnetically coupled with the corresponding detection coil among the plurality of detection coils 43-1 to 43-n. Then, the inductance of the reception coil 61 and the electrostatic capacitance of the resonance capacitor 62 are set so that the resonance circuit 63 resonates with the AC power supplied from the power supply circuit 41. Although FIG. 6 shows that two resonance capacitors 62 are connected in parallel to the reception coil 61, the number of resonance capacitors 62 included in the resonance circuit 63 is not necessarily two and may be one or three or more. Besides, the reception coil 61 and the resonance capacitor 62 may be connected in series. Furthermore, according to a modified example, the resonance circuit 63 itself may be formed by the corresponding detection coil 43-i and capacitor 44-i. That is, the detection coil 43-i and the capacitor 44-i may be provided in place of the reception coil 61 and the resonance capacitor 62 to simplify the configuration of the detection circuit 45.

The high-pass filter 64 is connected between the resonance circuit 63 and the amplifier 65 for attenuating a noise component, which has a frequency lower than the frequency of the AC power supplied from the power supply circuit 41, in the AC power received by the resonance circuit 63. The amplifier 65 is connected between the high-pass filter 64 and the half-wave rectifier circuit 66, and amplifies the AC power output from the high-pass filter 64.

The half-wave rectifier circuit 66 is connected between the amplifier 65 and the low-pass filter 67, and half-wave rectifies the amplified AC power output from the amplifier 65 and converts it into pulsating flow power. The low-pass filter 67 is connected between the half-wave rectifier circuit 66 and the voltage detection circuit 68, and smooths the pulsating flow power output from the half-wave rectifier circuit 66 and converts it into DC power.

The voltage detection circuit 68 is connected to the low-pass filter 67 and detects the voltage of the DC power output from the low-pass filter 67. The voltage detection circuit 68 then outputs the detected voltage to the determination circuit 69. The voltage detection circuit 68 can be any voltage detection circuit for detecting a DC voltage.

The determination circuit 69 determines whether the detected voltage is within a predetermined reference range. If the detected voltage is within the predetermined reference range, the determination circuit 69 determines that there is no foreign matter between the transmission coil 12 and the reception coil 21. However, if the detected voltage deviates from the predetermined reference range, the determination circuit 69 determines that there is a foreign matter entering between the transmission coil 12 and the reception coil 21. The determination circuit 69 then outputs a signal indicating the foreign matter detection result to the power supply circuit 11 of the power transmission device 2.

In this embodiment, the determination circuit 69 includes a conversion circuit that converts the voltage received from the voltage detection circuit 68 into a signal value, an arithmetic circuit for determining whether the signal value is within a predetermined reference range, and a communication circuit for outputting the signal indicating the foreign matter detection result to the power supply circuit 11 of the power transmission device 2.

The memory circuit 70 is an example of a memory unit, and has, for example, a non-volatile semiconductor memory or a volatile semiconductor memory and stores information representing the predetermined reference range.

Although FIG. 6 shows an example in which the detection circuit 45 is provided with the determination circuit 69 and the memory circuit 70 for each detection coil, the detection circuit 45 may be provided with one determination circuit 69 and one memory circuit 70 that are commonly used for each of the plurality of detection coils 43-1 to 43-n.

Figure 7:
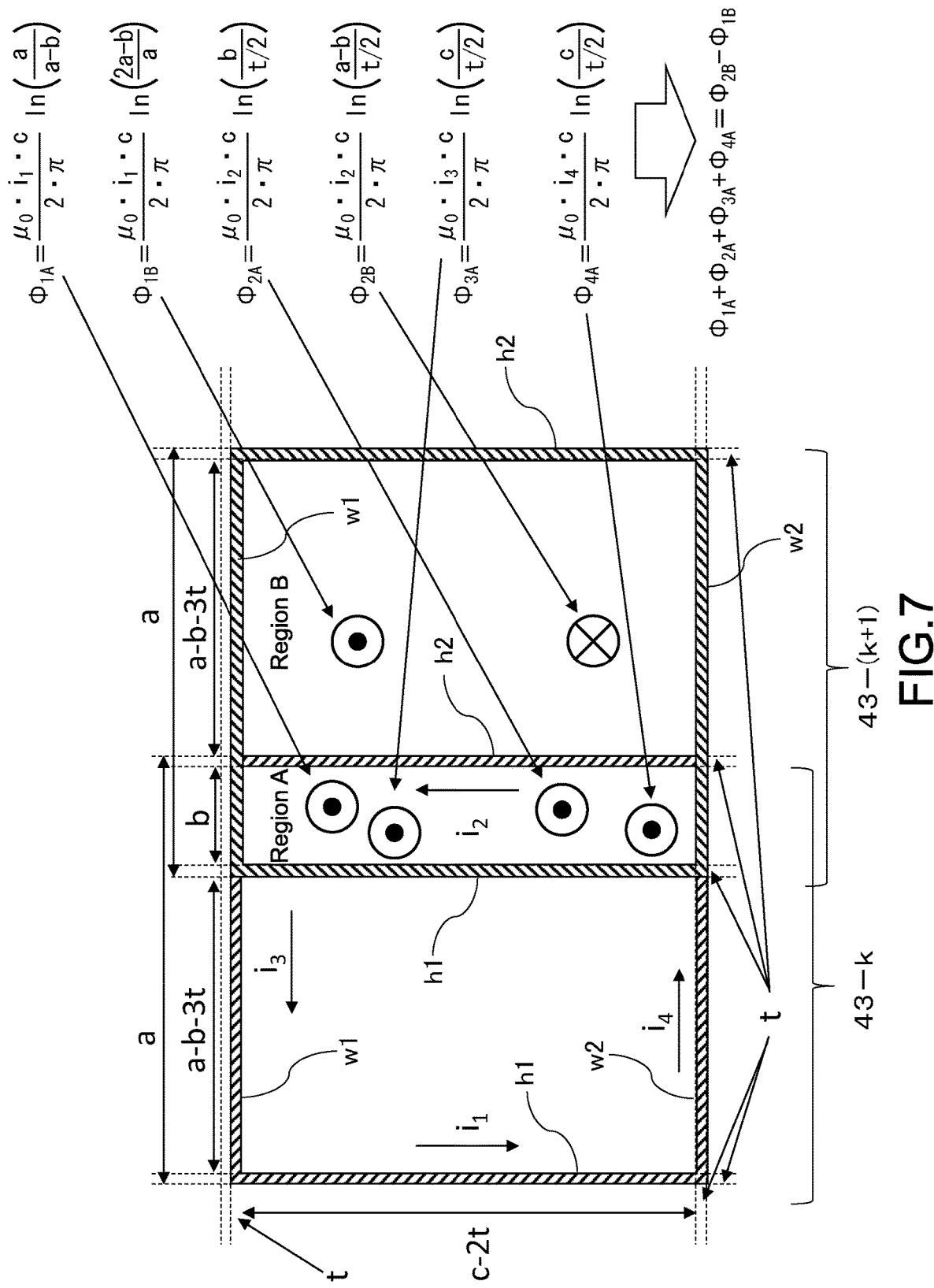
FIG. 7 is a diagram for illustrating the degree of overlap between two detection coils that are adjacent in the horizontal direction.

The degree of overlap between adjacent two detection coils will be described below. FIG. 7 is a diagram for illustrating the degree of overlap between two detection coils that are adjacent in the horizontal direction. In the example shown in FIG. 7, the two detection coils 43-k and 43-(k+1) have the same size and shape. Each of the two detection coils 43-k and 43-(k+1) is formed in a rectangular shape. In regard to each of the two detection coils 43-k and 43-(k+1), two horizontal sides w1 and w2 facing each other have a length a and two vertical sides h1 and h2 facing each other have a length c. In addition, the two detection coils 43-k and 43-(k+1) are each formed by a winding of a conductor that has a width t. Then, the detection coil 43-(k+1) is displaced to the right in the horizontal direction by a distance (a-b-2t) with respect to the detection coil 43-k

(where b<a). That is, the width of the region sandwiched between the right side h2 of the detection coil 43-*k* and the left side h1 of the detection coil 43-(*k*+1) is b. The position of the detection coil 43-*k* and the position of the detection coil 43-(*k*+1) are the same in the vertical direction.

In order to prevent electromagnetic coupling between the detection coil 43-*k* and the detection coil 43-(*k*+1), the interlinkage magnetic flux emitted from each side of one of the detection coil 43-*k* and the detection coil 43-(*k*+1) and passing through the inside of the other of the detection coil 43-*k* and the detection coil 43-(*k*+1) cancels each other, and as a result, the strength of the interlinkage magnetic flux becomes zero. Here, inside the detection coil 43-(*k*+1), a region where the detection coil 43-*k* and the detection coil 43-(*k*+1) overlap is defined as a region A, and a region where the detection coil 43-*k* and the detection coil 43-(*k*+1) do not overlap is defined as a region B. Then, the currents flowing through the sides h1, h2, w1, and w2 of the detection coil 43-*k* are $i_1$, $i_2$, $i_3$, and $i_4$, respectively. At this time, if t<<a, b, c, then the condition under which the strength of the interlinkage magnetic flux emitted from each side of the detection coil 43-*k* and passing through the inside of the detection coil 43-(*k*+1) becomes 0 is expressed by the following formula.

$$\phi_{1A} + \phi_{2A} + \phi_{3A} + \phi_{4A} = \phi_{2B} - \phi_{1B} \quad [\text{Formula 1}]$$

$$\phi_{1A} = \frac{\mu_0 \cdot i_1 \cdot c}{2 \cdot \pi} \cdot \ln\left(\frac{a}{a-b}\right)$$

$$\phi_{1B} = \frac{\mu_0 \cdot i_1 \cdot c}{2 \cdot \pi} \cdot \ln\left(\frac{2a-b}{a}\right)$$

$$\phi_{2A} = \frac{\mu_0 \cdot i_2 \cdot c}{2 \cdot \pi} \cdot \ln\left(\frac{b}{t/2}\right)$$

$$\phi_{2B} = \frac{\mu_0 \cdot i_2 \cdot c}{2 \cdot \pi} \cdot \ln\left(\frac{a-b}{t/2}\right)$$

$$\phi_{3A} = \frac{\mu_0 \cdot i_3 \cdot b}{2 \cdot \pi} \cdot \ln\left(\frac{c}{t/2}\right)$$

$$\phi_{4A} = \frac{\mu_0 \cdot i_4 \cdot b}{2 \cdot \pi} \cdot \ln\left(\frac{c}{t/2}\right)$$

Here, $\Phi_{pq}$ is the magnetic flux generated by the current $i_p$ (p=1, 2, 3, 4) flowing through the corresponding side of the detection coil 43-*k*, and passing through the region q (q=A or B). Also, $\mu_0$ is the magnetic permeability of a vacuum. When the current flowing through each side of the detection coil 43-*k* is equal to the current flowing through each side of the detection coil 43-(*k*+1) due to symmetry and the formula (1) is satisfied, the strength of the interlinkage magnetic flux emitted from each side of the detection coil 43-(*k*+1) and passing through the inside of the detection coil 43-*k* also becomes zero.

For example, it is assumed that the length of each side of the two detection coils is 20 10 mm (that is, a=c=20 mm), the width t of the winding of each detection coil is 0.1 mm, and the minimum spacing between the two windings at the portion where the winding of the detection coil 43-*k* and the winding of the detection coil 43-(*k*+1) overlap is 0.1 mm. Then, it is assumed that the current flowing through each side of the detection coil 43-*k* is equal (that is, $i_1=i_2=i_3=i_4$). In this case, the value of b that satisfies the formula (1) based on theoretical calculation is 2.2 mm. That is, when the detection coil 43-*k* and the detection coil 43-(*k*+1) overlap by approximately 11% of the length of one side of the detection coil 43-*k*, the two detection coils are no longer electromagnetically coupled to each other and the coupling coefficient is zero. In addition, assuming that the length of each side of the two detection coils is 10 mm and other conditions are the same as above, the value of b that satisfies the formula (1) based on theoretical calculation is 1.18 mm.

Furthermore, even though the coupling coefficient between adjacent two detection coils may not become completely zero, if the change in resonance characteristics due to electromagnetic coupling between the two detection coils is sufficiently smaller than the change in resonance characteristics due to the presence of a foreign matter, the mutual electromagnetic coupling can be ignored in foreign matter detection. Thus, each detection coil is arranged so that the two detection coils overlap to an extent that the coupling coefficient between the adjacent two detection coils is less than 0.02 to less than 0.03. For example, in the above example where the length of each side of the detection coil is 20 mm, a predetermined amount of overlap between adjacent two detection coils may be set so that the value of b falls within the range of 1.9 mm to 2.5 mm.

Figure 8:
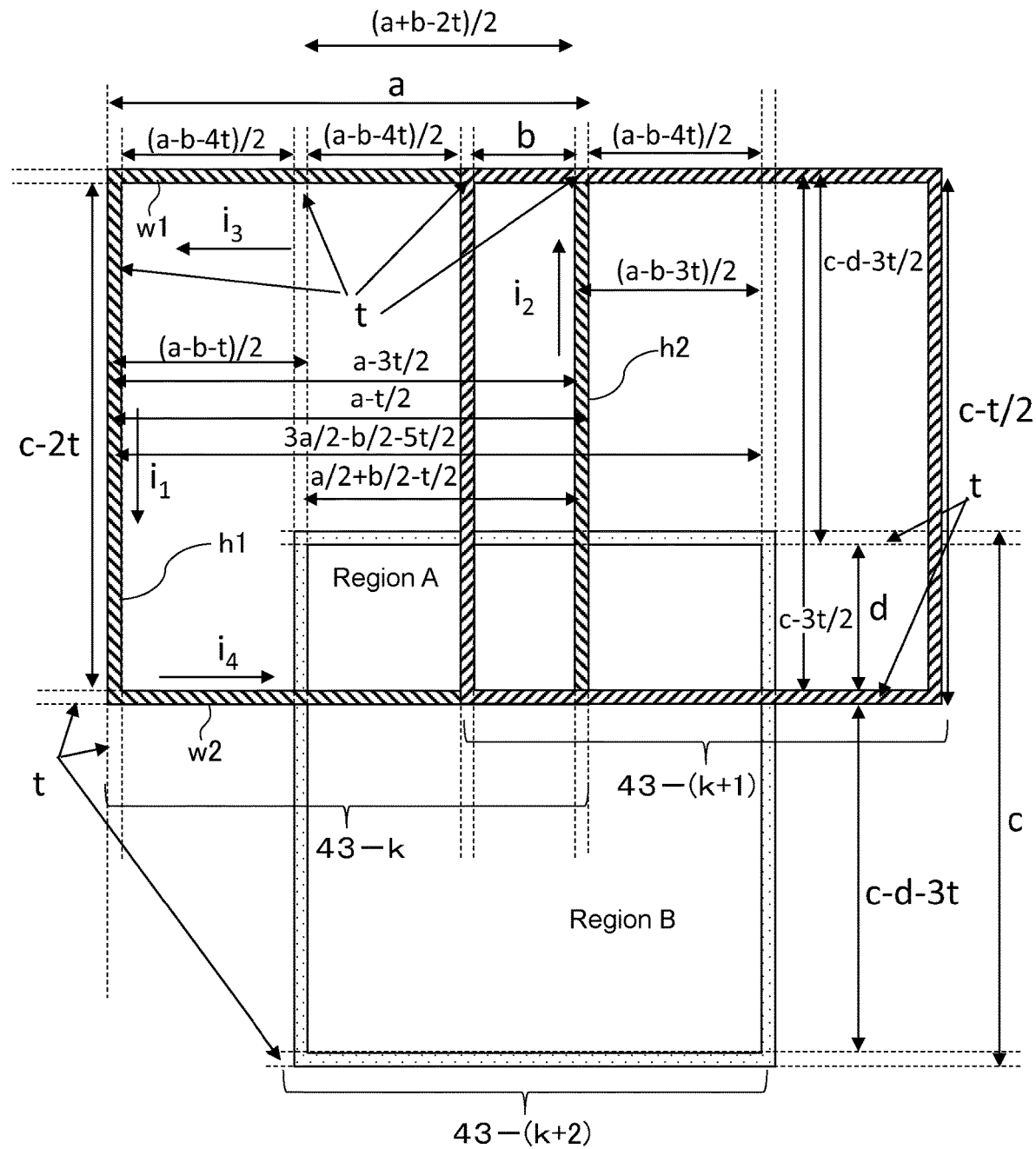
FIG. 8 is a diagram for illustrating the degree of overlap between two detection coils that are adjacent in the oblique direction.

FIG. 8 is a diagram for illustrating the degree of overlap between two detection coils that are adjacent in the oblique direction. In the example shown in FIG. 8, like the example shown in FIG. 7, three detection coils 43-*k*, 43-(*k*+1), and 43-(*k*+2) have the same size and shape. Each detection coil is formed in a rectangular shape. In regard to each detection coil, two horizontal sides w1 and w2 facing each other have a length a and two vertical sides h1 and h2 facing each other have a length c. In addition, each detection coil is formed by a winding of a conductor that has a width t. Then, the detection coil 43-(*k*+1) is displaced to the right in the horizontal direction by a distance (a-b-2t) with respect to the detection coil 43-*k* (where b<a). This b is a distance at which the detection coil 43-*k* and the detection coil 43-(*k*+1) are not electromagnetically coupled.

The position of the detection coil 43-*k* and the position of the detection coil 43-(*k*+1) are the same in the vertical direction. Further, the detection coil 43-(*k*+2) is arranged to be positioned at the middle point between the detection coil 43-*k* and the detection coil 43-(*k*+1) in the horizontal direction. That is, the detection coil 43-(*k*+2) is displaced respectively from the detection coil 43-*k* and the detection coil 43-(*k*+1) along the horizontal direction by a distance (a-b-2t)/2. Also, in the vertical direction, the detection coil 43-(*k*+2) is displaced downward by a distance (c-d-2t) with respect to each of the detection coil 43-*k* and the detection coil 43-(*k*+1) (where d<c). That is, the width of the region sandwiched between the lower side w2 of the detection coil 43-*k* and the upper side w1 of the detection coil 43-(*k*+2) is d. In order to prevent electromagnetic coupling between the detection coil 43-*k* and the detection coil 43-(*k*+2), the interlinkage magnetic flux emitted from each side of one of the detection coil 43-*k* and the detection coil 43-(*k*+2) and passing through the inside of the other of the detection coil 43-*k* and the detection coil 43-(*k*+2) cancels each other, and as a result, the strength of the interlinkage magnetic flux becomes zero. Here, inside the detection coil 43-(*k*+2), a region where the detection coil 43-*k* and the detection coil 43-(*k*+2) overlap is defined as a region A, and a region where the detection coil 43-*k* and the detection coil 43-(*k*+2) do not overlap is defined as a region B. Then, the currents flowing through the sides h1, h2, w1, and w2 of the detection coil 43-*k* are $i_1$, $i_2$, $i_3$, and $i_4$, respectively. At this time, if t<<a, b, c, d, then the condition under which the interlinkage magnetic flux emitted from each side of the detection coil 43-$k$ and passing through the inside of the detection coil 43-$(k+1)$ becomes 0 is expressed by the following formula.

$$\phi_{1A} + \phi_{2A} + \phi_{3A} + \phi_{4A} = \phi_{2B} + \phi_{4B} - \phi_{1B} - \phi_{3B} \quad \text{[Formula 2]}$$

$$\phi_{1A} = \frac{\mu_0 \cdot i_1 \cdot d}{2 \cdot \pi} \cdot \ln\left(\frac{a - 3t/2}{\frac{a}{2} - \frac{b}{2} - \frac{t}{2}}\right) = \frac{\mu_0 \cdot i_1 \cdot d}{2 \cdot \pi} \cdot \ln\left(\frac{2a}{a-b}\right)$$

$$\phi_{1B} = \frac{\mu_0 \cdot i_1 \cdot d}{2 \cdot \pi} \cdot \ln\left(\frac{\frac{3a}{2} - \frac{b}{2} - \frac{5t}{2}}{a - \frac{t}{2}}\right) = \frac{\mu_0 \cdot i_1 \cdot d}{2 \cdot \pi} \cdot \ln\left(\frac{3a-b}{2a}\right)$$

$$\phi_{2A} = \frac{\mu_0 \cdot i_1 \cdot d}{2 \cdot \pi} \cdot \ln\left(\frac{\frac{3a}{2} + \frac{b}{2} - \frac{t}{2}}{t/2}\right) = \frac{\mu_0 \cdot i_2 \cdot d}{2 \cdot \pi} \cdot \ln\left(\frac{a+b}{t}\right)$$

$$\phi_{2B} = \frac{\mu_0 \cdot i_2 \cdot d}{2 \cdot \pi} \cdot \ln\left(\frac{\frac{a}{2} - \frac{b}{2} - \frac{3t}{2}}{t/2}\right) = \frac{\mu_0 \cdot i_2 \cdot d}{2 \cdot \pi} \cdot \ln\left(\frac{a-b}{t}\right)$$

$$\phi_{3A} = \frac{\mu_0 \cdot i_3 \cdot (a+b-2t)/2}{2 \cdot \pi} \cdot \ln\left(\frac{c - \frac{3t}{2}}{c - d - \frac{3t}{2}}\right) =$$

$$\frac{\mu_0 \cdot i_3 \cdot (a+b)/2}{4 \cdot \pi} \cdot \ln\left(\frac{c}{c-d}\right)$$

$$\phi_{3B} = \frac{\mu_0 \cdot i_3 \cdot (a+b-2t)/2}{2 \cdot \pi} \cdot \ln\left(\frac{2c - d - \frac{7t}{2}}{c - \frac{t}{2}}\right) =$$

$$\frac{\mu_0 \cdot i_3 \cdot (a+b)/2}{4 \cdot \pi} \cdot \ln\left(\frac{2c-d}{c}\right)$$

$$\phi_{4A} = \frac{\mu_0 \cdot i_4 \cdot (a+b-2t)/2}{2 \cdot \pi} \cdot \ln\left(\frac{d}{t/2}\right) =$$

$$\frac{\mu_0 \cdot i_4 \cdot (a+b)/2}{4 \cdot \pi} \cdot \ln\left(\frac{2d}{t}\right)$$

$$\phi_{4B} = \frac{\mu_0 \cdot i_4 \cdot (a+b-2t)/2}{2 \cdot \pi} \cdot \ln\left(\frac{c - d - \frac{5t}{2}}{t/2}\right) =$$

$$\frac{\mu_0 \cdot i_4 \cdot (a+b)/2}{4 \cdot \pi} \cdot \ln\left(\frac{2(c-d)}{t}\right)$$

Here, $\Phi_{pq}$ is the magnetic flux generated by the current $i_p$ (p=1, 2, 3, 4) flowing through the corresponding side of the detection coil 43-$k$, and passing through the region q (q=A or B). Also, $\mu_0$ is the magnetic permeability of a vacuum. Accordingly, in order to prevent electromagnetic coupling between the detection coil 43-$(k+1)$ and the detection coil 43-$(k+2)$, the distance d may be set to satisfy the formula (2). Further, the detection coil 43-$(k+2)$ is positioned at the center of the detection coil 43-$k$ and the detection coil 43-$(k+1)$ in the horizontal direction, and the positional relationship between the detection coil 43-$(k+2)$ and the detection coil 43-$k$ is the same as the positional relationship between the detection coil 43-$(k+2)$ and the detection coil 43-$(k+1)$ in the vertical direction. Accordingly, by setting the distance d not to satisfy the formula (2), the detection coil 43-$(k+1)$ and the detection coil 43-$(k+2)$ are not electromagnetically coupled. Furthermore, the detection coils are arranged so that the detection coil 43-$(k+2)$ and the detection coil 43-$k$ overlap in the vertical direction by a predetermined amount that corresponds to a range of about several percent (%) of the length of one side of each detection coil, centered on the distance d by which the formula (2) is satisfied, thereby allowing electromagnetic coupling between these detection coils to be ignored in foreign matter detection.

In addition, in a case where the detection coils are formed in a circular shape and the same size, electromagnetic field simulations were performed assuming that the width of the winding of each detection coil is sufficiently small relative to the length of the perimeter of each detection coil. As a result, when adjacent two detection coils overlap by approximately 25% of the diameter, the coupling coefficient between the two detection coils is zero. Then, if the degree of overlap between adjacent two detection coils is within a range of about several percent (%) of the diameter centered at approximately 25% of the diameter, the influence of electromagnetic coupling between the two detection coils on the change in resonance characteristics when a foreign matter is present can be ignored. Accordingly, each of the plurality of detection coils may be arranged such that the predetermined amount of overlap between adjacent two detection coils is approximately 20% to approximately 30% of the diameter of the detection coils.

Furthermore, in a case where each detection coil has a shape other than that shown in the above example, an electromagnetic field simulation may be performed to determine the predetermined amount of overlap that allows electromagnetic coupling between adjacent two detection coils to be ignored.

As described above, the foreign matter detection device includes a plurality of detection coils provided on a substrate that is arranged between a transmission coil and a reception coil when a power transmission device and a power reception device are in a positional relationship which allows power to be transmitted from the power transmission device to the power reception device. The foreign matter detection device supplies AC power to each of the plurality of detection coils via a power feeding coil arranged to be electromagnetically coupled with the plurality of detection coils, and detects the voltage output according to the supplied AC power for each detection coil by a detection circuit. Then, the foreign matter detection device determines that a foreign matter has entered between the transmission coil and the reception coil when the voltage output from any of the detection coils deviates from a predetermined reference range. Furthermore, each of the plurality of detection coils is arranged so that adjacent two detection coils, among the plurality of detection coils, overlap by a predetermined amount that allows mutual electromagnetic coupling to be ignored when viewed from the normal direction of the substrate. Thus, the foreign matter entering between the transmission coil and the reception coil is positioned inside any one of the detection coils when viewed from the normal direction of the substrate, and the detection coil whose resonance characteristics are changed by the foreign matter is not affected by other detection coils. Accordingly, even if a foreign matter smaller than either of the transmission coil and the reception coil enters at any position between the transmission coil and the reception coil, the foreign matter detection device is still capable of detecting the foreign matter. Hence, the foreign matter detection device is able to improve the accuracy of detecting the foreign matter entering between the transmission coil and the reception coil.

According to a modified example, the foreign matter detection device 4 may be attached to the power reception device 3. In this case, the power reception device 3 may further include a switching element (not shown) in parallel to the reception coil 21 for switching whether to short-circuit both ends of the reception coil 21, and a control circuit (not shown) for switching whether to turn on or off the switching element. Then, a signal indicating the foreign matter detection result from the detection circuit 45 is output to the control circuit of the power reception device 3, and when the signal indicates that a foreign matter has been detected between the transmission coil 12 and the reception coil 21, the control circuit turns on the switching element to short-circuit both ends of the reception coil 21. As a result, the power transmission from the power transmission device 2 to the power reception device 3 is interrupted to prevent the foreign matter from causing a failure.

Further, as described above, the power transmission device 2 and the power reception device 3 may each have a communication device (not shown) for communicating with each other. In this case, when the signal received from the detection circuit 45 of the foreign matter detection device 4 indicates that a foreign matter has been detected between the transmission coil 12 and the reception coil 21, the control circuit of the power reception device 3 may send a signal instructing to stop the power transmission to the power transmission device 2 via the communication device. The control circuit of the power supply circuit 11 of the power transmission device 2 may stop supplying power from the power supply circuit 11 to the transmission coil 12 when receiving the signal instructing to stop the power transmission via the communication device.

Furthermore, the foreign matter detection device 4 may be attached to each of the power transmission device 2 and the power reception device 3. That is, two foreign matter detection devices 4 may be arranged between the transmission coil 12 and the reception coil 21.

Thus, those skilled in the art can make various modifications within the scope of the disclosure according to the embodiments.

What is claimed is:

1. A foreign matter detection device, comprising:
   a plurality of detection coils arranged at different positions between a transmission coil of a power transmission device and a reception coil of a power reception device, through which power is transmitted in a contactless manner;
   a plurality of capacitors forming, for each of the plurality of detection coils, a resonance circuit together with the detection coil;
   a power feeding coil arranged to be electromagnetically coupled with each of the plurality of detection coils;
   a power supply circuit supplying AC power having a predetermined frequency to each of the plurality of detection coils via the power feeding coil; and
   a detection circuit detecting a voltage output from each of the plurality of detection coils with respect to the AC power supplied, and detecting a foreign matter entering between the transmission coil and the reception coil according to the voltage detected,
   wherein each of the plurality of detection coils is arranged to overlap by a predetermined amount that allows electromagnetic coupling between adjacent two of the plurality of detection coils to be ignored.

* * * * *